MAGNETIC PEN RECORDER MECHANISM

Filed Sept. 5, 1961 6 Sheets-Sheet 1

INVENTORS
ARLING DIX BROWN JR.
& CHESTER L. MORRIS
BY
RICHEY, McNENNY & FARRINGTON
William J. Flynn
ATTORNEYS

MAGNETIC PEN RECORDER MECHANISM

Filed Sept. 5, 1961 6 Sheets-Sheet 2

INVENTORS
ARLING DIX BROWN JR.
& CHESTER L. MORRIS
BY
RICHEY, McNENNY, & FARRINGTON
William J. Flynn
ATTORNEYS INVENTORS
ARLING DIX BROWN JR.,
& CHESTER L. MORRIS
BY
RICHEY, McNENNY & FARRINGTON
William J. Flynn
ATTORNEYS INVENTORS
ARLING DIX BROWN, JR.
& CHESTER L. MORRIS
BY
RICHEY, McNENNY & FARRINGTON
William J. Flynn
ATTORNEYS May 7, 1963 A. D. BROWN, JR., ETAL 3,088,788

MAGNETIC PEN RECORDER MECHANISM

Filed Sept. 5, 1961 6 Sheets-Sheet 5

INVENTORS
ARLING DIX BROWN JR.,
& CHESTER L. MORRIS
BY
RICHEY, McNENNY & FARRINGTON
William J. Flynn
ATTORNEYS

MAGNETIC PEN RECORDER MECHANISM

Filed Sept. 5, 1961 6 Sheets-Sheet 6

INVENTORS
ARLING DIX BROWN JR.
& CHESTER L. MORRIS
BY
RICHEY, McNENNY & FARRINGTON
William J. Flynn
ATTORNEYS United States Patent Office 3,088,788

Patented May 7, 1963

3,088,788

MAGNETIC PEN RECORDER MECHANISM

Arling Dix Brown, Jr., Cleveland Heights, and Chester L. Morris, Richmond Heights, Ohio, assignors to Clevite Corporation, a corporation of Ohio Filed Sept. 5, 1961, Ser. No. 135,943
14 Claims. (Cl. 346—139)

This invention is directed to improvements related specifically to a rectilinear pen recorder and also having utility in other environments.

Prior to the present invention, magnetic pen recorders have been used extensively for recording electrical signals having frequencies up to 100 cycles per second or so. Commonly, such recorders have comprised a moving coil galvanometer in which a coil of electrically conductive wire is rotatably mounted between the opposite polarity pole faces of a permanent magnet system. The electrical signal which is to be recorded is applied to the coil, and the coil turns angularly by an amount proportional to the amplitude of this signal. A recording stylus coupled to the coil records a visual trace on a moving record chart of paper or the like.

In most recorders of this general type, the recording stylus was arranged to turn angularly in unison with the coil, so that the recording tip of the stylus recorded an arcuate visual trace on the record web. In many instances the user of such a recorder may prefer to have a record with a rectilinear trace, i.e., one in which the recording tip of the stylus has recorded straight-line traces extending perpendicular to the length of the record.

In accordance with an important aspect of the present invention, a novel linkage is provided for converting the rotational movement to substantially straight-line movement, so that the recording tip of the stylus in such a recorder may record a substantially rectilinear trace.

Accordingly, it is an important object of this invention to provide in a pen recorder a novel and improved arrangement for producing a rectilinear visual trace on a record chart.

Another, more general, object of this invention is to provide a novel and improved linkage for converting rotational movement to substantially straight-line movement, or vice versa.

Further objects and advantages of the present invention will be apparent from the following detailed description of certain presently-preferred embodiments thereof, which are illustrated in the accompanying drawings.

Figures 1, 2:
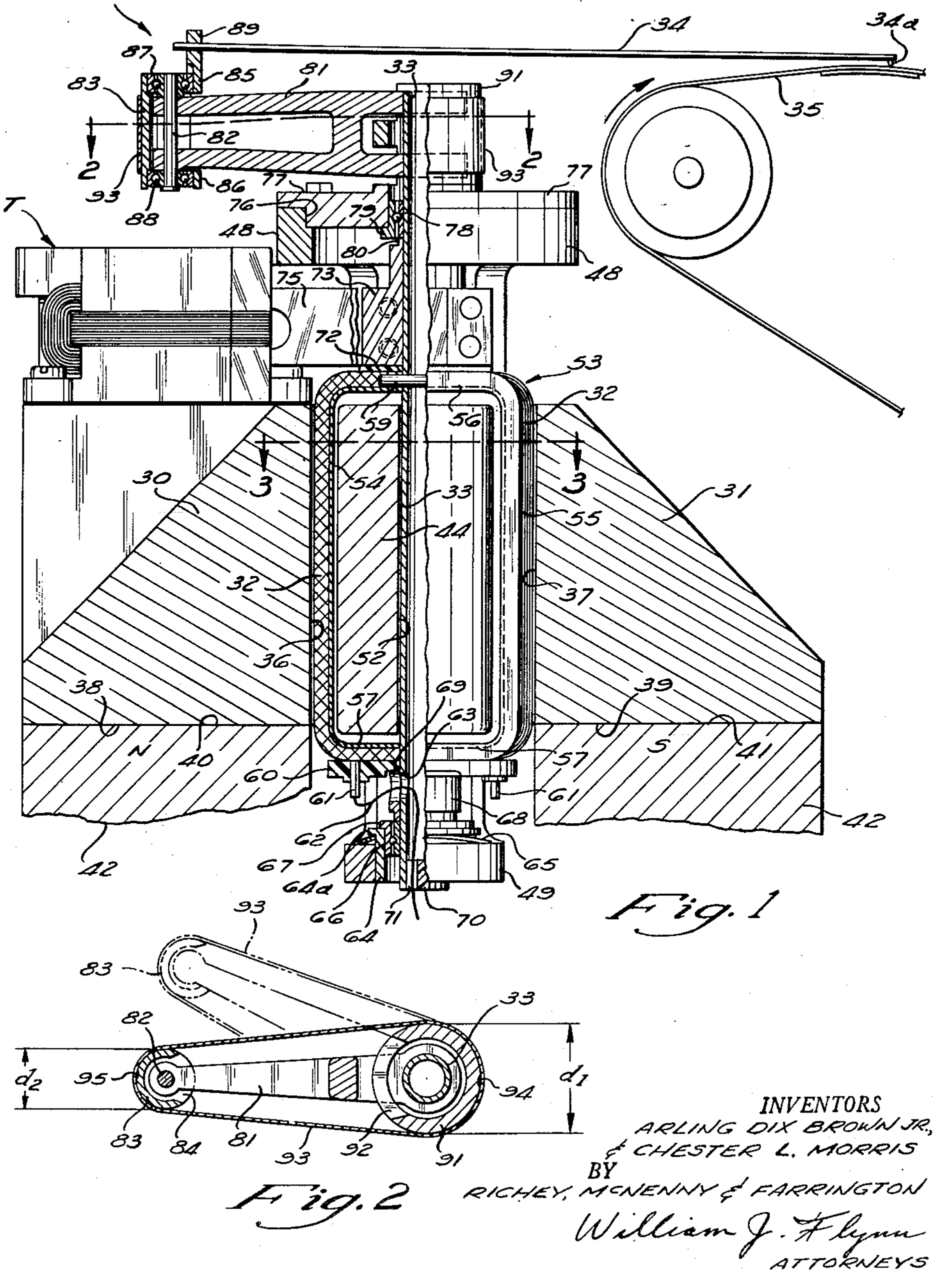
FIGURE 1 is a section through a magnetic pen recorder in accordance with a first embodiment of this invention, showing the moving coil and associated parts partly in section and partly in elevation.
FIGURE 2 is a section through the linkage for driving the recording stylus, taken along the line 2—2 in FIGURE 1.

Referring first to FIGURE 1, the present invention is shown as embodied in a magnetic pen recorder for making a visual record of electrical input signals. In broad outline the recorder comprises a pen motor including a permanent magnet system having opposite polarity pole pieces 30 and 31, a rotatably mounted driving coil 32 of electrically conductive wire between these pole pieces, and a shaft 33 connected to the coil to turn in unison with it, and a linkage system L driven by the pen motor shaft 33 and including a pen 34 for recording a substantially straight-line trace laterally across a moving record web 35.

The electrical input signals which are to be recorded are applied to the coil 32. In accordance with well-known principles, the coil 32 turns about its axis from a neutral position through an angle which is substantially linearly proportional to the amplitude of the input signal. A restoring force, tending to return the driving coil to a position determined by the input signal, may be provided by a spring or by an electrical feedback signal which is impressed on the coil. In the preferred embodiment, this restoring force is provided by a feedback signal from an electromechanical transducer T operating in response to the moving coil.

Figures 3, 5:
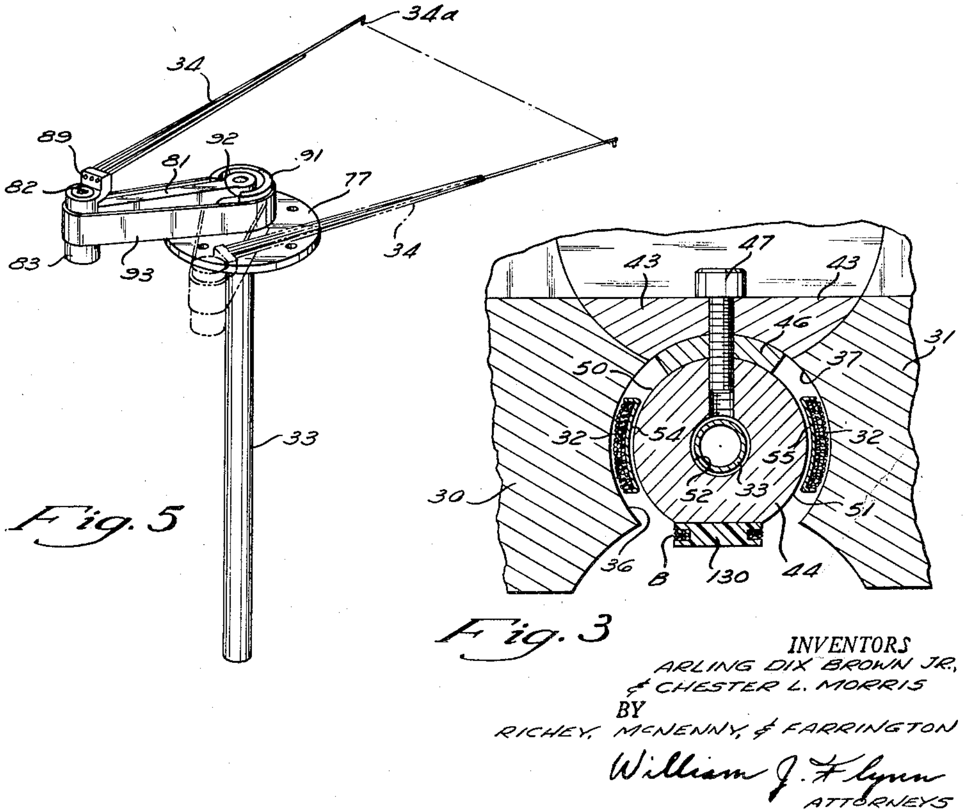
FIGURE 3 is a section taken along the line 3—3 in FIGURE 1.
FIGURE 5 is a perspective view of the linkage for converting rotational movement of the moving coil to rectilinear movement of the recording tip of the stylus in the recorder of FIGURE 1.

Referring to FIGURES 1 and 3, the pole pieces 30 and 31 present spaced, confronting, concave, cylindrical pole faces 36 and 37 (FIG. 3) which are on a common circle about a central axis extending vertically in FIGURE 1. The pole pieces are of soft magnetic material. They have flat co-planar bottom faces 38 and 39 which engage the opposite pole tips 40 and 41 of a conventional horse-shoe permanent magnet 42. The pole pieces 30 and 31 are held spaced apart from one another by a rigid piece 43 (FIG. 3) of non-magnetic metal, such as brass or stainless steel.

Figure 4:
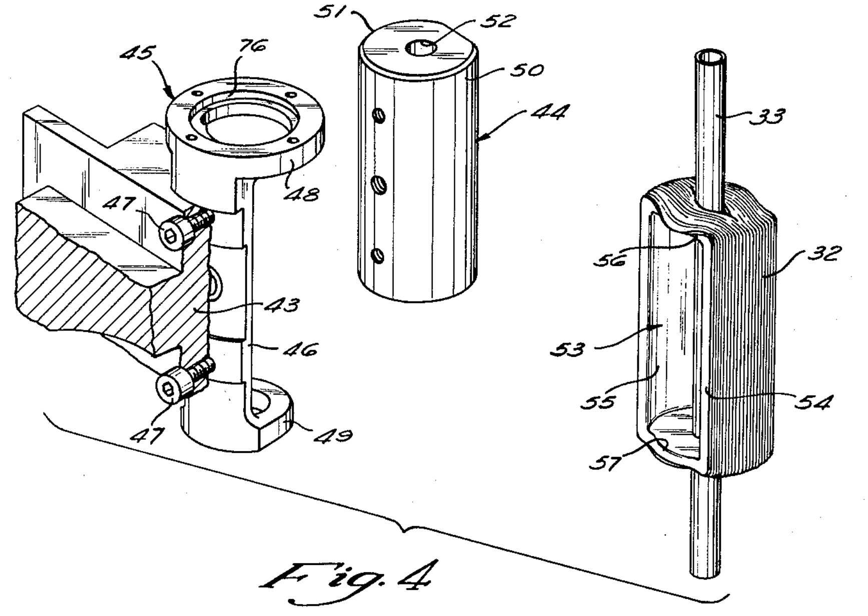
FIGURE 4 is an exploded perspective view of the moving coil, the central core, and the core support in the pen motor of the FIGURE 1 recorder.

A core 44 of soft magnetic material is fixedly mounted centrally in the gap between the opposite pole faces 36 and 37. A holder 45 (FIG. 4) of non-magnetic material, such as aluminum, engages the core in this position. As shown in FIGURE 4, this holder comprises an elongated leg 46 of arcuate cross-section, which is secured by screws 47 to the non-magnetic piece 43, and integral annular opposite end portions 48 and 49. The core 44 engages the inside face of the support leg 46 and is held in place by the screws 47. As best seen in FIGURE 3, the core presents arcuate surfaces 50 and 51 which are equally spaced from, and concentric with, the opposite pole faces 36 and 37, respectively. The core is formed with an axial through passage 52.

The moving coil 32 is made up of a multiplicity of turns of very fine, enameled, copper wire wound lengthwise around a generally rectangular coil frame 53 of non-magnetic material, such as aluminum, and potted adhesively thereto into an integral unit. Throughout its length the coil frame 53 is channel-shaped in cross-section, as best seen in FIGURE 3. The unitary coil structure presents a first leg 54 extending lengthwise in the space between pole face 36 and core surface 50, an opposite leg 55 extending lengthwise in the space between pole face 37 and core surface 51, and opposite end members 56 and 57 joining these legs and extending across the opposite ends of the core 44 in spaced relation thereto, as shown in FIGURE 1. As shown in FIGURE 3, the base of the channel at each leg 54 and 55 of the coil structure has an arcuate configuration concentric with the respective pole face near it. The unitary coil structure throughout its entire extent is spaced from the pole faces 36 and 37 and from the core 44. The frame is provided primarily for convenience in winding the coil and may be omitted, if desired.

The coil structure is physically reinforced against deformation due to torsional stresses and bending stresses in the plane of the coil structure. To this end there is provided a rigid shaft 33 extending freely through the central passage 52 in the core 44. The opposite end members 56 and 57 of the coil structure are fixedly secured to this shaft, preferably by an adhesive epoxy resin. As shown in FIGURE 1, a cross pin 59 extends through shaft 33 within the end member 56 of the coil structure in the gap formed by the wires on the frame. This pin assists in anchoring the coil structure to the shaft. Preferably, the shaft 33 is hollow.

It has been found that the presence of this one-piece shaft 33 extending lengthwise through the core 44 and attached to the opposite ends of the coil structure greatly enhances the structural rigidity of the coil assembly, so that the latter does not deform out of shape as a result of the stresses to which it is subjected. This is important to insure that undesired extraneous mechanical deflections will not occur to affect the stability of the overall feedback system of the pen recorder.

In FIGURE 1 an insulation plate 60 is bonded to the lower end of the coil assembly. A plurality of electrical terminal posts 61, which are connected to the coil, extend down through this plate. Insulated lead-in wires 62 connected to these posts extend through an opening 63 in the shaft 33 into the hollow interior of the shaft. These lead-in wires extend down and out the lower end of the shaft, where they are connected in the external electrical circuit.

The lower end portion 49 of the core support member 45 receives a flanged sleeve 64 (FIG. 1). A Belleville spring washer 65 is engaged between the top face of core support portion 49 and a flange 64*a* on the upper end of sleeve 64. A ball bearing assembly 66 is engaged between sleeve 64 and the coil shaft 33. The outer race member of this ball bearing assembly has a flange 67 at its upper end which overlies the upper end of sleeve 64. An annular collar 68, which is fixedly connected to shaft 33, is engaged between the upper end of the inner race member of the ball bearing assembly 66 and the lower face of insulation plate 60. Collar 68 has a side opening 69 which registers with the shaft opening 63 to pass the lead-in wires 62. With this arrangement, the spring washer 65 resiliently biases shaft 33 to a fixed axial position.

An insulation plug 70 closes the lower end of shaft 33. This plug has a passage 71 for passing the lead-in wires 62.

An insulation plate 72 overlies the upper end of coil 32. Directly above this plate a collar 73 is clamped rigidly to shaft 33. This collar carries the movable element 75 of the feedback transducer T, which will be described in detail hereinafter.

The upper end portion 48 on the core support member 45 has an internal annular groove 76, as best seen in FIGURES 1 and 4. An annular cover plate 77 is bolted to the top of core support portion 48 and extends down into the groove 76 in the latter. A ball bearing assembly

78 is engaged between this cover plate and the shaft 33. The outer race member of this bearing has a lateral flange 79 on its lower end which engages beneath the cover plate 77. The collar 73 has a reduced diameter upper end extremity 80 which engages beneath the inner race member of this bearing.

In accordance with the present invention, a novel linkage is provided for converting the rotational movement of shaft 33 into substantially straight-line movement of the point 34*a* of the pen 34 throughout a relatively long stroke.

This linkage includes a rigid lateral arm 81 fixedly connected to shaft 33 to turn in unison therewith. This arm extends perpendicular to the shaft in a direction away from the record web 35. At its free end the linkage arm 81 carries a post 82, which extends in spaced, parallel relationship to the shaft 33. The post 82 is rigidly secured to linkage arm 81 in any suitable manner. A hollow second shaft member 83 is mounted on post 82 for rotation about the latter's axis. Shaft member 83 has a cylindrical periphery of a predetermined diameter $d_2$, except at 84 where it is cut away (FIG. 2) to receive the free end of linkage arm 81. Only above and below this arm the shaft member 83 presents annular upper and lower portions 85 and 86 (FIG. 1) which completely surround the post 82. At these portions, ball bearing sets 87 and 88 are engaged between the post 82 and shaft member 83.

An upwardly extending piece 89 is connected to the upper end of shaft member 83 at the side of the latter which is disposed toward the pen motor shaft 33, as best seen in FIGURE 5. The recording pen 34 is mounted in cantilever fashion on this piece 89, so that the pen moves in unison with shaft member 83. The recording pen extends to the opposite side of the pen motor shaft 33 from shaft member 83.

As shown in FIGURES 1 and 5, a hub 91 integral with cover plate 77 extends upward from the latter. This hub has a peripheral surface of a predetermined diameter $d_1$ which is cylindrical about the axis of shaft 33. As best seen in FIGURES 2 and 5, this stationary hub is cut away at 92 to pass the linkage arm 81 and to permit angular movement of the latter about the axis of shaft 33 as shaft 33 turns. This hub 91 constitutes a fixed reaction member in the linkage between the pen motor shaft 33 and the recording pen 34.

A flexible band 93 (FIGS. 2 and 5) of suitable metal is fixedly attached at one point 94 to the cylindrical periphery of the stationary hub 91 and is fixedly attached at one point 95 on the opposite side of the cylindrical periphery of shaft member 83. The band 93 extends tautly (i.e., without slack) between hub 91 and shaft 83 on opposite sides of linkage arm 81. This band 93 constitutes a means acting between the fixed reaction member (hub 91) and shaft member 83 in the operation of this linkage.

When the pen motor shaft 33 rotates about its own fixedly-positioned axis, the coupling provided by band 93 between stationary hub 91 and shaft 83 causes the shaft 83 to turn about its own axis in a direction opposite to the direction in which shaft 33 turns. At the same time shaft 83 swings in an arc about the axis of the pen motor shaft 33, due to the rigid linkage arm 81 connecting shaft 33 and the pivot post 82 for shaft 83.

In accordance with the present invention it is possible to achieve substantially straight-line movement of the pen tip 34*a* throughout the complete width of the recording channel on the record web 35. Not only does the pen tip have but a very slight deviation from straight-line movement, but also its movement laterally from the centerline of the record web is substantially proportional to the angular movement of the pen motor shaft 33.

Figure 6:
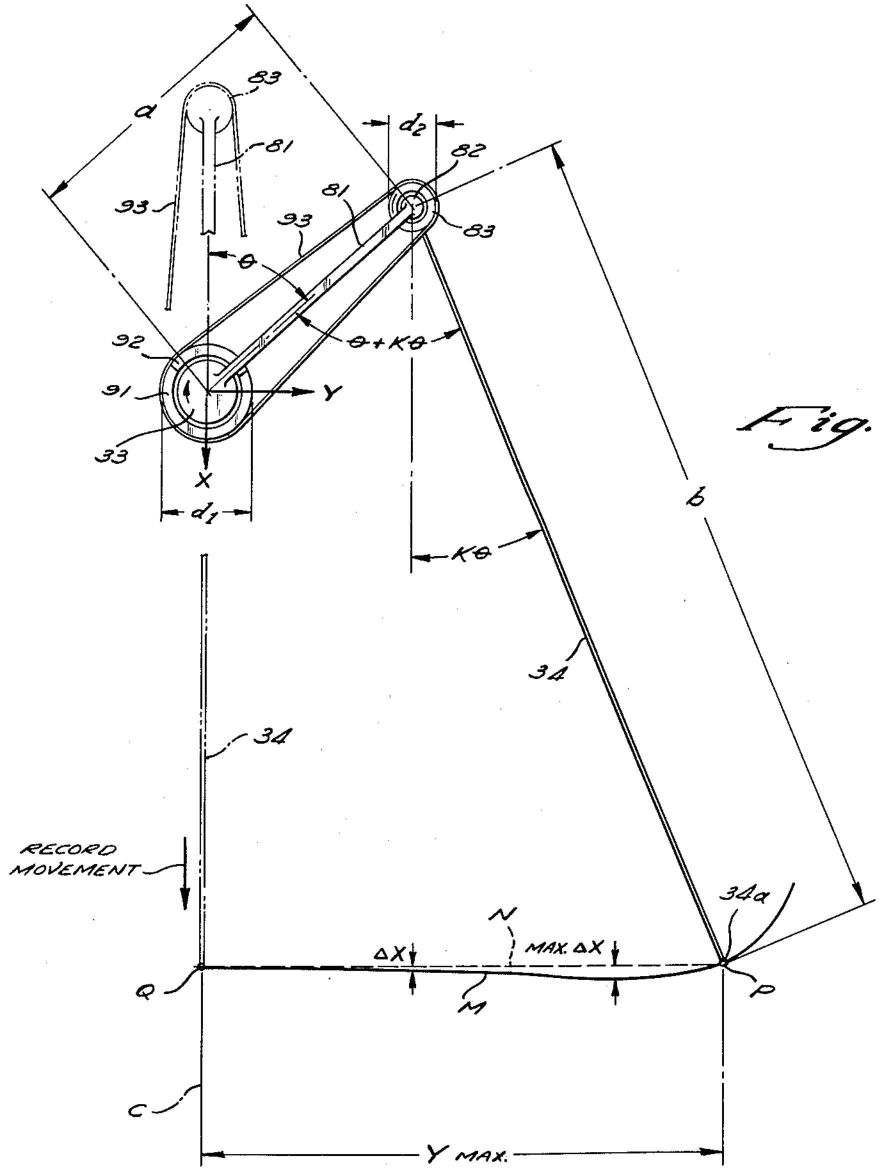
FIGURE 6 is an enlarged schematic plan view of this linkage.

Referring to FIGURE 6, the centered position of the pen is shown in phantom. In this position, the pen 34 and linkage arm 81 are directly aligned with one another, and both are aligned with the centerline C of the recording channel on the record web 35, which moves in the direction indicated by the arrow. The axis of shaft 33 is approximately aligned with the centerline of the recording channel on the record web.

Assume that a signal of predetermined polarity is applied to coil 32, such that it turns clockwise in FIGURE 6 through an angle $\theta$. As a result, the linkage arm 81 moves through an angle $\theta$, causing shaft 83 to revolve $\theta$ degrees about the axis of shaft 33. At the same time, shaft 83 turns about its own axis counter-clockwise through $\theta+K\theta$ degrees. In accordance with the present invention, the value K is made less than unity. It is determined by the diameters $d_1$ and $d_2$ of stationary hub 91 and shaft 83, as explained hereinafter. The point 34*a* of pen 34 is caused to move from a point Q on the centerline C laterally across the recording channel on the record web 35 along a line M which deviates only slightly from a straight-line path N (shown in dashed lines) until the point P is reached, at which line M crosses straight line N. Laterally beyond this point the pen deviation from straight-line movement reverses in direction and increases greatly in magnitude, so that it is not practically useful for recording purposes. However, this critical point is located near the edge of the recording channel, so that recording would not be done beyond this region in any event. The distance between points Q and P is designated as Y max.

The deviation of the pen point in the X direction in FIG. 6 from straight-line movement is designated by $\Delta X$. The maximum $\Delta X$ occurs at approximately 7/10 of the distance from point Q to crossover point P. It is to be understood that FIGURE 6 greatly exaggerates the deviation or error, $\Delta X$, in order to clarify the description. In actual practice max. $\Delta X$ may be held below 0.1% of the total recording width, that is, max. $\Delta X<.001$ (2Y max.).

The substantially straight-line movement of the pen tip 34*a* is determined by proper choice of the value K in accordance with the present invention. From FIGURE 6 it will be evident that, as shaft 33 turns $\theta$ degrees, shaft 83 turns $(\theta+K\theta)$ degrees with respect to lever arm 81. Therefore $(1+K)$ is the ratio of rotational movement of shaft 83 about its own axis, relative to arm 81, to the rotational movement of shaft 33 about its own axis. It will be apparent that K may be expressed in terms of the diameter $d_1$ of stationary hub 91 and the diameter $d_2$ of shaft 83 as follows:

$$K=\frac{d_1}{d_2}-1=\frac{d_1-d_2}{d_2} \qquad (1)$$

The coordinates of movement of the pen tip 34*a* from its centered position Q in FIGURE 6 may be expressed exactly as follows, in terms of the length $a$ of the link between the axes of shafts 33 and 83, the length $b$ of the pen arm 34 from the axis of shaft 83 to the pen tip 34*a*, the angle $\theta$ through which shaft 33 is turned, and the value K (with $X=0$, $Y=0$ being at the axis of shaft 33):

$$x=-a\cos\theta+b\cos K\theta \qquad (2)$$

$$y=a\sin\theta+b\sin K\theta \qquad (3)$$

For small angles $\theta$, the following approximations hold true with only negligible error, $\theta$ being expressed in radians:

$$\cos\theta=1-\frac{\theta^2}{2} \qquad (4)$$

$$\cos K=1-\frac{K^2\theta^2}{2} \qquad (5)$$

Using these approximations, Equation 2 becomes:

$$x=-a\left(1-\frac{\theta^2}{2}\right)+b\left(1-\frac{K^2\theta^2}{2}\right) \qquad (6)$$

Then, $$x=b-a+\frac{\theta^2}{2}(a-bK^2) \qquad (7)$$

For a constant $x$, that is, for straight-line movement of pen tip 34*a* along line N in FIGURE 6, $$\frac{\theta^2}{2}(a-bK^2)=\text{constant} \qquad (8)$$

or $$a-bK^2=0 \qquad (9)$$

$$K^2=a/b \qquad (10)$$

$$K=\sqrt{a/b} \qquad (11)$$

Equation 11, therefore, expresses a theoretical value of K in terms of $a$ and $b$ for straight-line movement of pen tip 34*a* through the small angle range of $\theta$ for which the approximations expressed in Equations 4 and 5 are substantially correct.

Assuming, for purposes of the following discussion, that $a:b=1:3$, then in accordance with Formula 11 the theoretical K may be $\sqrt{1/3}$, or .577. However, for practical purposes this is not the optimum K, for reasons which will now be explained.

Figure 7:
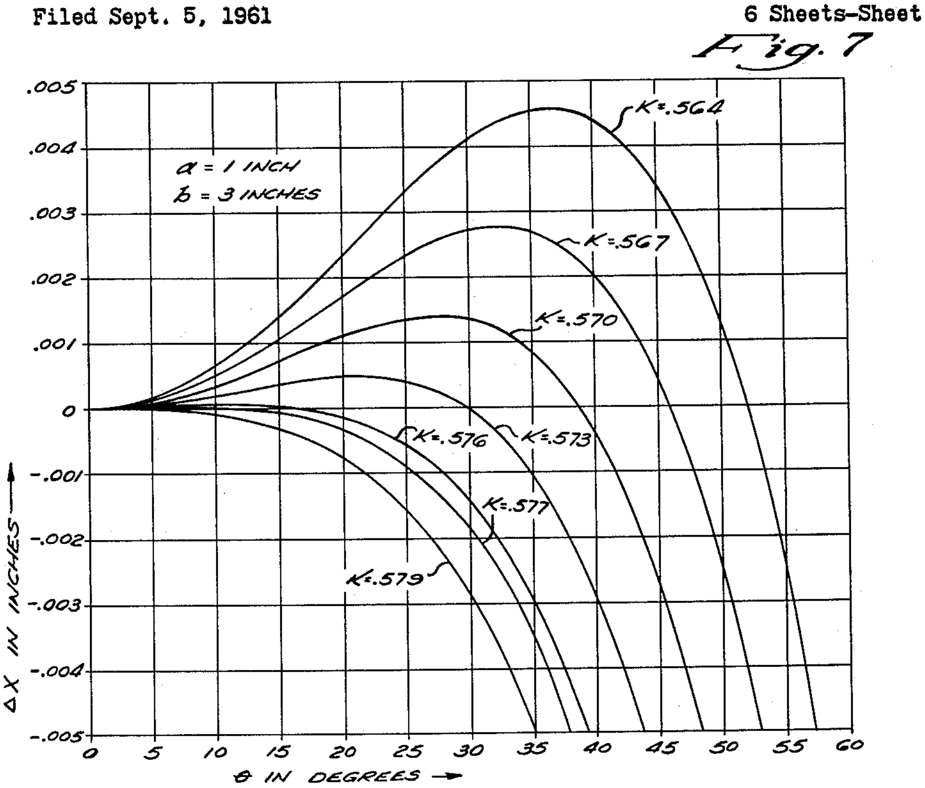
FIGURE 7 is a graph showing the pen deviation from linearity versus the angular movement of the coil shaft for various shaft diameter ratios in this linkage.

FIGURE 7 shows curves of $\Delta X$ versus $\theta$ in accordance with the exact Formula 2 above. (In FIGURE 7, $a$ is assumed to be one inch and $b$ three inches.) That is, these curves are correct for large, as well as small values of $\theta$. From the curve for $K=.577$ (the theoretical K according to Equation 11) it will be seen that $\Delta X$ has a zero value for only a relatively few degrees $\theta$, after which it becomes negative at a progressively increasing rate. (When $\Delta X$ is negative, the pen tip 34*a* is above the straight-line N in FIGURE 6.)

The curves in FIGURE 7 for other values of K show that the angle $\theta$ (and thus the recording width of the recording channel) can be extended by selecting a lower K than the theoretical value $\sqrt{a/b}$. This introduces an error, $\Delta X$, which is progressively greater for greater deviations from the theoretical K. However, considering this error as a percentage of the total recording width, i.e., $$\text{Percent error}=\frac{\text{max. }\Delta X}{2Y\text{ max.}}\times 100 \qquad (12)$$

when K is .564 (i.e., .013 less than the theoretical K of .577), the percentage error is less than 0.1% for values of $\theta$ up to 52°. In practice, this enables the pen to record over a record track of about 4.5 inches with but a negligible percentage error from straight-line movement. That is, by accepting this small error or deviation from straight-line movement, the effective stroke of the pen is greatly increased over what it would be if K were equal to the theoretical value $\sqrt{a/b}$.

If K is chosen as .576, then the percentage error is less than 0.01% for values of $\theta$ up to 17°. This is suitable for a recording track of 40 millimeters (still assuming that $a=1$ inch and $b=3$ inches in the linkage).

Thus, in addition to the novel principle of making the factor K less than unity, the present invention is based on the further novel principle of providing an additional term, $\Delta k$, in the equation for computing K in terms of the lever arms $a$ and $b$ of the linkage. Accordingly, in accordance with the present invention $$K=\sqrt{\frac{a}{b}}+\Delta k \qquad (13)$$

K being less than unity, $b$ being greater than $a$, and $\Delta k$ being negative in sign and having a magnitude equal to a small fraction of $\sqrt{a/b}$. Preferably, $\Delta k$ is less than .05 in order to provide a reasonably close rectilinearity.

It will be noted that in FIGURE 7, for the $K=.564$ curve, the error, $\Delta X$, is positive in sign for values of $\theta$ up to about 52° and negative in sign beyond this. As shown by the full line trace, M, in FIGURE 6, when $\Delta X$ is positive in sign the pen tip is below the straight-line N. The few degrees of pen movement beyond $\theta=52°$, during which the magnitude of $\Delta X$ is still negligible, may be ignored for practical purposes, such as by being located beyond the recording track, if desired.

Figure 8:
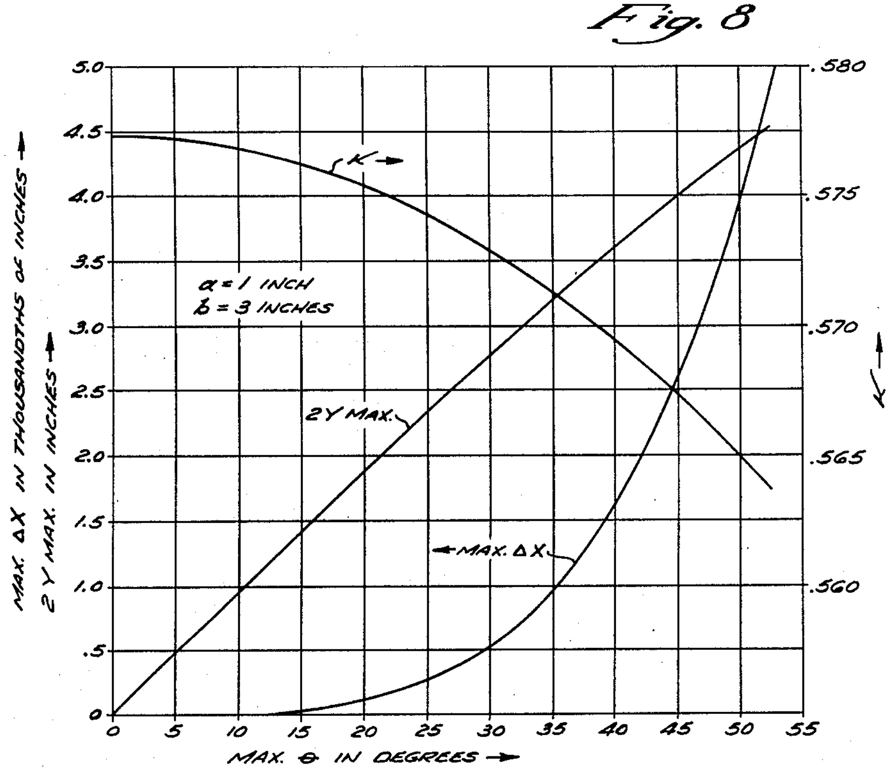
FIGURE 8 is a graph showing several parameters for this linkage plotted against the angular movement of the coil shaft.

Still assuming lever arms of three inches and one inch, FIGURE 8 shows a plot of K versus maximum $\theta$ for the intersections of the K curves with the $\Delta X$=zero axis in FIGURE 7. That is, this curve gives the optimum value of K to accommodate a given angular movement $\theta$ of shaft 33 and still have a minimum deviation of the pen tip 34a from straight-line movement (ignoring the relatively few degrees beyond the crossover on the zero axis where $\Delta X$ is negative but still within this tolerance).

FIGURE 8 also shows a curve of the maximum error, $\Delta X$, in thousandths of an inch, versus $\theta$ for the same conditions (i.e., ignoring the region where $\Delta X$ is negative).

FIGURE 8 also shows a curve of 2Y max. versus max. $\theta$, Y being the movement of the pen tip laterally from the centerline C of the record chart. Y max. is computed according to Equation 3, using as $\theta$ the $\Delta X=0$ crossover point in FIGURE 7.

In the foregoing discussion, lever arms of three inches and one inch were chosen because this is a desirable arrangement for a magnetic pen recorder. A pen arm length of three inches provides a sufficient overhang of the pen arm 34, as shown in FIGURE 1, so that the paper web 35 may be passed up in front of the pen motor and then beneath the pen in a convenient fashion. Also, the pen arm 34 is short enough to have adequate rigidity, and the linkage as a whole has sufficiently low mass that its inertia is not excessive.

However, it is to be understood that the novel principles of the present invention may be embodied in devices where the ratio of $b:a$ differs from this particular value.

Figure 9:
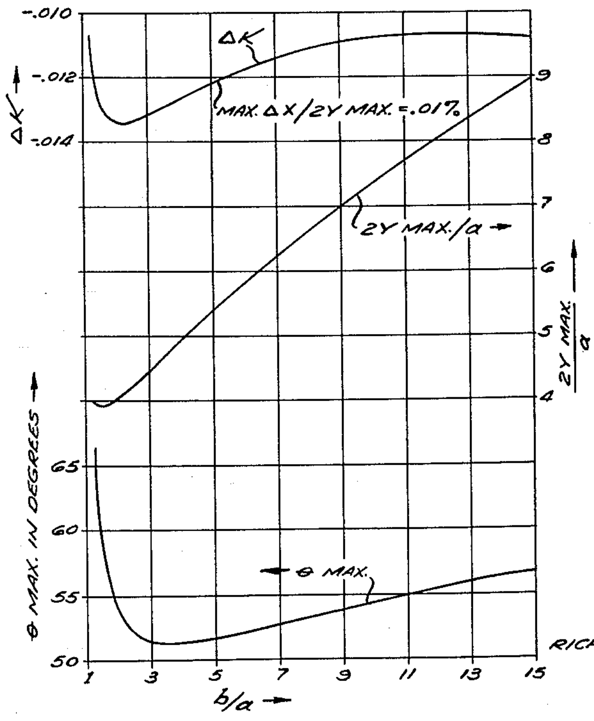
FIGURE 9 is a graph showing several parameters for this linkage plotted against various lever arm ratios in this linkage.

FIGURE 9 shows a plot of $\Delta k$ versus $b/a$, which gives an error of 0.1%. Error is defined as stated in Equation 12. $\Delta k$ is found by plotting K curves, as in FIGURE 7, using the different values of $b/a$, and for each such K curve choosing the smallest value of K which satisfies the 0.1% maximum deviation requirement. $\Delta k$ equals this chosen K minus $\sqrt{a/b}$.

From the $\Delta k$ curve in FIGURE 9, it will be apparent that for $b/a$ ratios from about 1.2 up to 15 the value of $\Delta k$ is within the narrow range from about —.010 to —.014, so that in all cases $\Delta k$ is negative and has a magnitude equal to a very small fraction of $\sqrt{a/b}$. For example, for $b:a=1.2$, $\Delta k$ is about 1% of $\sqrt{a/b}$; for $b:a=15$, $\Delta k$ is about 4% of $\sqrt{a/b}$.

FIGURE 9 also shows a plot of $\theta$ max. against $b/a$. $\theta$ max. is the maximum angular movement of shaft 33 during which the pen tip movement is a straight line, with less than 0.1% error. $\theta$ max. is determined, for each value of $b/a$, from the chosen K curves (such as in FIG. 7) used in determining $\Delta k$ in FIGURE 9. $\theta$ max. is chosen as the point at which the chosen K curve of $\Delta X$ versus $\theta$ crosses over the zero line from positive to negative.

FIGURE 9 also shows a plot of $2Y$ max./$a$ versus $b/a$. 2Y max. is computed from Equation 3, using the corresponding values of $\theta$ from the $\theta$ max. curve in FIGURE 9.

In some instances the stroke of the free end of the longer lever arm $b$ in the linkage will not have to be the maximum length possible, for example, if the record chart is narrow. Assuming a given $a$ and $b$, if the record chart is relatively narrow, the percentage error of non-linearity may be reduced by making $\Delta k$ smaller in magnitude than the $\Delta k$ value indicated by the curve in FIGURE 9. Thus, as already mentioned for lever arms $a$ and $b$ of one and three inches, respectively, if $\Delta k$ is .001 then the percentage error is less than 0.01%.

It may be stated as a general proposition that for a percentage error of non-linearity not substantially greater than 0.1%, the optimum value of $\Delta k$ will fall somewhere within the range from about zero to —.014 depending upon the stroke required and depending upon the dimensions of the lever arms in the linkage. This holds true for lever arm ratios from about 1.2:1 to 15:1 and higher.

For magnetic pen recorders specifically, because of other design considerations, $a/b$ preferably is within the range from about ½ to ⅓. For the error limit of 0.1% assumed in FIGURE 9, this makes $\Delta k$ very close to —.013.

It will be apparent that, in accordance with the principles of the present invention as explained herein, the ratio of the lever arms $b$ and $a$ is greater than 1:1 and may be as great as 15:1 or higher. From the practical standpoint a ratio close to 1:1 is undesirable because this will require that the pen tip (or any other device which it is desired to move linearly) move along a line passing substantially directly opposite the input shaft. As the other extreme, if the $b/a$ ratio is 9:1 or higher, it may be difficult to keep the longer lever arm, $b$, rigid and of sufficiently small mass to be practically useful.

For many other applications of this linkage a deviation in excess of 0.1% may be tolerable. This, of course, will change the range of $\Delta k$ from the range shown in FIGURE 9, which is for a deviation not greater than 0.1% from straight-line movement. Where a greater deviation from straight-line movement can be tolerated, $\Delta k$ may be greater in magnitude, but it will be negative in sign and it will be a small fraction of $a/b$.

Figures 10, 11, 12:
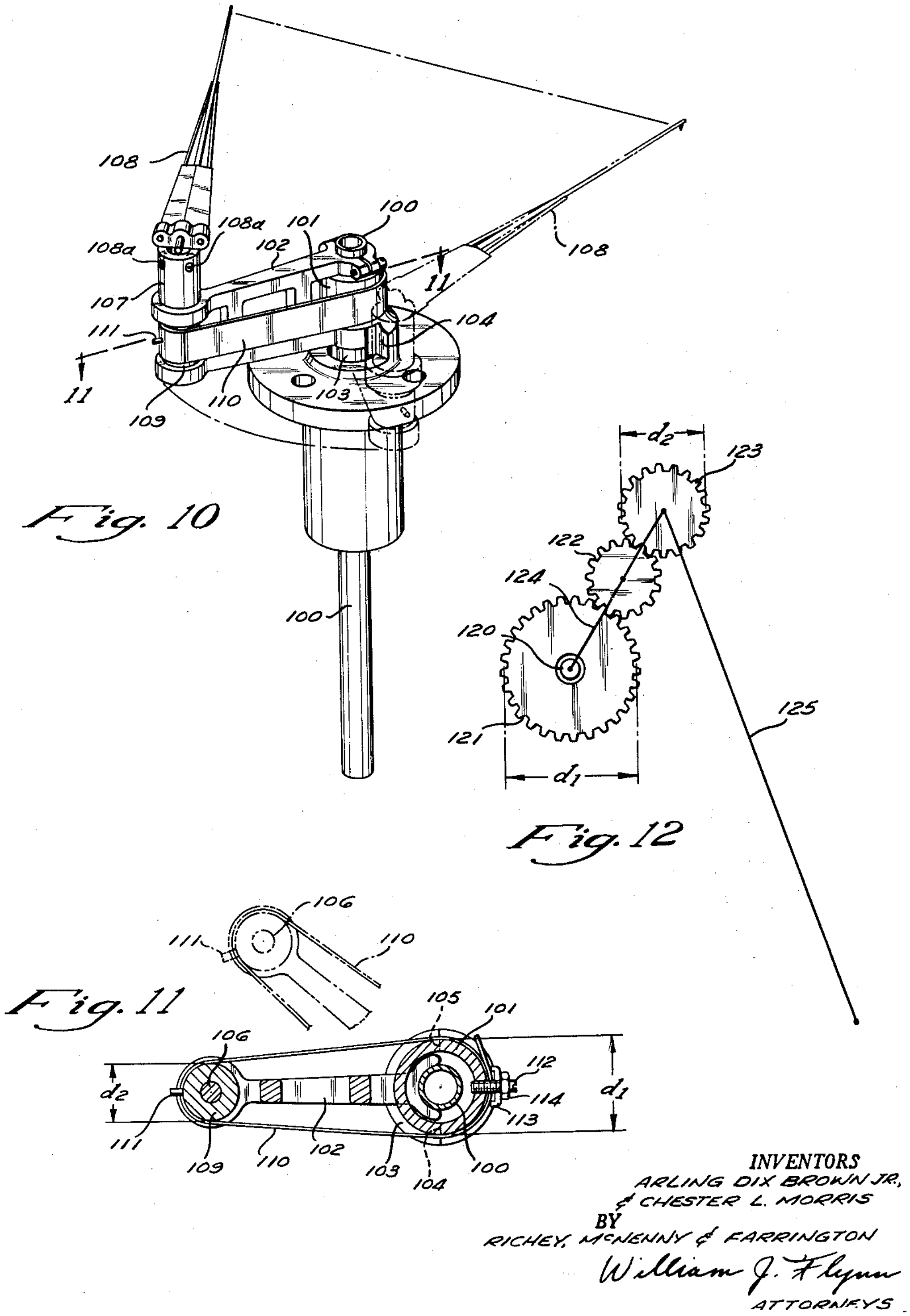
FIGURE 10 is a perspective view of an alternative linkage, in accordance with the present invention, for converting rotational movement to rectilinear movement.
FIGURE 11 is a section taken along the line 11—11 in FIGURE 10.
FIGURE 12 is a schematic plan view of a further alternative embodiment of the linkage of the present invention.

FIGURES 10 and 11 show an alternative embodiment of the linkage in the present invention, differing in structural detail from the embodiment of FIGURES 1, 2 and 5 but having the same essential principles of operation.

Referring to FIGURES 10 and 11, the shaft 100 is connected to the rotating drive in the pen motor (not shown). This shaft is rotatably supported by suitable anti-friction bearings in a stationary hub having a portion 101 with a cylindrical periphery of a diameter $d_1$ which is concentric with the shaft. A rigid link 102 is suitably attached to shaft 100 above and below the cylindrical hub portion 101. This link extends laterally from the shaft 100 and turns in unison with the shaft. Below its cylindrical portion 101 the hub is cut away at 103 through a wide arc, terminating in shoulders 104 and 105.

At its opposite end the link 102 carries a second shaft 106, provided with suitable anti-friction bearings (not shown) which enable it to turn about its own axis, parallel to shaft 100. A collar 107 is an integral part of shaft 106. The pen 108 is connected to this collar by set screws 108a and extends laterally therefrom. The pen moves in unison with shaft 106.

Between the upper and lower legs of link 102 the shaft 106 carries a cylindrical collar 109. This collar is rigidly attached to shaft 106 and has a cylindrical periphery coaxial with shaft 106 and of a diameter $d_2$.

A flexible metal band 110 is fixedly attached to the periphery of collar 109 by a pin 111 on the collar extending snugly through a corresponding opening in the band. The opposite ends of band 110 are in overlapped relationship and here they engage the opposite peripheral portion of stationary hub 101. A screw-threaded pin 112 carried by hub 101 extends snugly through corresponding aligned openings in the overlapped ends of the band. A dished retainer plate 113 and a nut 114 on this pin clamp the band tightly against hub 101.

The band 110 extends tautly (i.e., without slack) between hub 101 and collar 109. Accordingly, when shaft 100 rotates, shaft 106 is caused to turn about its own axis, as well as revolving about the axis of shaft 100. The ratios of the diameters, $d_1$ and $d_2$, of hub 101 and collar 109 and the lengths of link 102 and pen 108 are chosen to provide substantially straight-line movement of the writing tip of the pen, in accordance with the principles already explained in detail.

The advantage of this particular linkage construction is that it enables a wider swing of link 102, as compared with the swing possible for the link 81 in the first-described embodiment.

An important practical advantage of each of the foregoing embodiments of the linkage of the present invention is that the most important dimensional tolerances which must be maintained involve cylindrical dimensions and concentricities. This is relatively easily accomplished. The relatively movable parts of the linkage have only two bearing regions, and at both of these the bearings are solely rotational. Therefore, there is no serious problem relating to overcoming friction which might interfere with the proper operation of the linkage.

FIGURE 12 illustrates schematically a different linkage arrangement which may be used to convert the rotary movement of the coil shaft to linear movement of the pen tip.

In this embodiment, the coil shaft 120 is rotatable in a stationary gear 121 having a pitch diameter $d_1$ and coaxial with the shaft. An idler gear 122 is in meshing engagement with gear 121. A gear 123 is in meshing engagement with the idler gear 122 at the opposite side thereof from the stationary gear 121. Gear 123 is on a shaft having its axis parallel to the axes of shaft 120, gear 121 and idler gear 122, and has a pitch diameter $d_2$ which is smaller than $d_1$. In this embodiment of the present linkage, gear 121 constitutes a fixed reaction member concentric with the coil shaft 120, and idler gear 122 constitutes a means acting between this fixed reaction member and the gear 123 (and the latter's shaft).

A rigid link 124 is connected to shaft 120 and extends laterally therefrom. The idler gear 122 and gear 123 are both rotatably supported by this link. The pen 125 is attached to the shaft for gear 123 to move in unison therewith.

With this arrangement, when shaft 120 turns, the link 124 turns with it. The idler gear 122 carried by link 124 turns gear 123 in the opposite angular direction from shaft 120 and at an angular speed determined by the values of $d_1$ and $d_2$, according to Equation 1. These diameters and the ratio of the lever arms 124 and 125 should be chosen, in accordance with the principles of this invention as already explained in detail, to produce substantially straight-line movement of the free end of lever arm 125 in response to turning of the shaft 120.

Figure 13:
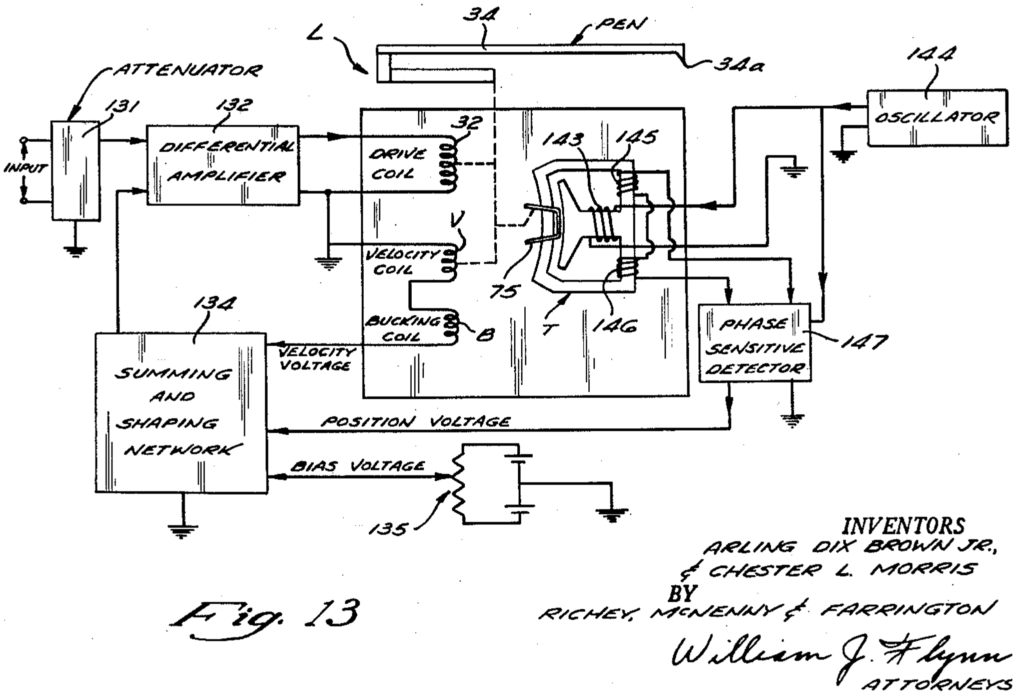
FIGURE 13 is a schematic diagram of the electrical circuit which includes the pen recorder of FIGURE 1.

Reference is now made to the electrical circuit diagram shown schematically in FIGURE 13.

The moving coil 32, whch is the drive coil of the pen motor, is shown as being mechanically coupled (dashed lines) to the linkage L for driving the rectilinear recording pen 34.

A velocity coil V is wound on the same coil frame 53 as the drive coil 32. The function of this coil is to sense the instantaneous velocity of the drive coil 32 and produce a feedback signal for damping the movement of the drive coil.

The effects of mutual induction between the drive coil 32 and the velocity coil V produce an error in this feedback signal. This error may be substantially eliminated by providing a bucking coil B connected electrically in series opposition with the velocity coil. As shown in FIGURE 3, this bucking coil may be wound on an insulation frame 130 which is bolted to the flat surface on the core 44. The bucking coil thus is positioned stationary, but in mutually inductive relationship to the drive coil 32.

The arrangement is such that the voltage induced in the bucking coil B is equal and opposite to the component of the velocity feedback voltage which is due to mutual induction between drive coil 32 and velocity coil V. These cancel each other, leaving as the corrected velocity feedback signal only the voltage due to the velocity of the drive coil 32 and velocity coil V.

As shown in FIGURE 13, the input signal which is to be recorded is applied first to an attenuator 131 and then to a differential amplifier 132 before being applied to the drive coil 32 of the pen motor.

A second input signal is applied to amplifier 132 from a summing and shaping network 134. One input to network 134 is the aforementioned corrected velocity feedback signal from velocity coil V. A second input to network 134 is a bias voltage from a suitable adjustable bias source 135. A third input to network 134 is a position voltage, whose magnitude depends upon the rotational position of the drive coil 32.

In the differential amplifier 132, the signal from summing and shaping network 134 is compared with the input signal from 131, and if there is a difference between these two signals, an amplified signal is applied to the drive coil to restore the pen to its correct position.

Figures 14, 15:
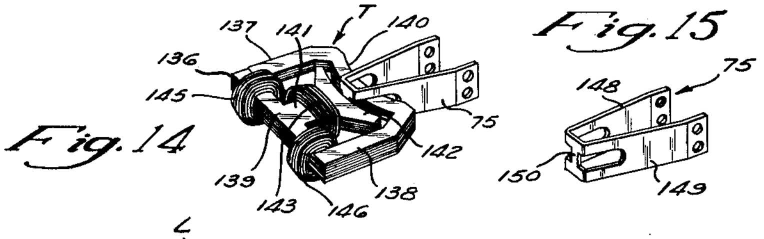
FIGURE 14 is a perspective view of the feedback transducer associated with the pen recorder of FIGURE 1.
FIGURE 15 is a perspective view of the movable armature of this transducer.

As already mentioned a feedback transducer T is associated with the pen recorder. The details of this transducer and of its feedback circuit are not the subject of the present invention, but they are described herein for the sake of completeness. Preferably, this transducer is of the general type disclosed in U.S. Patent 2,631,272 to Smith. Referring to FIGURE 14, the transducer comprises a laminated magnetic core 136 having opposite end legs 137 and 138, a back leg 139 interconnecting the end legs, an arcuate front leg 140 interconnecting the end legs, and a center leg 141 which extends from the back leg and terminates in an arcuate enlargement 142 extending in close-spaced, parallel relationship to the inside face of the front leg 140.

An input coil 143 is wound on the center leg 141 of the core. As shown in FIGURE 13, this input coil is connected to be energized by an oscillator 144.

A pair of series-connected output coils 145 and 146 are wound on the back leg of the core on opposite sides of the center leg. These output coils are connected in series opposition with each other across the input terminals of a phase sensitive detector 147 (FIG. 13). Oscillator 144 provides another input signal to the detector 147. The output of this detector 147, which is a voltage proportional to the position of the pen, is applied to the "position voltage" input terminal of the summing and shaping network 134.

The transducer T also includes a movable armature member 75 which is connected to the coil shaft 33, as already described. This armature member is a single loop of electrically conductive material and is made up of laterally spaced legs 148 and 149 (FIG. 15) which are bifurcated at their front ends to straddle the front leg 140 of the transducer core. A bridging segment 150 joined to these legs at their front ends is disposed in the air gap between the confronting faces of the core portions 142 and 140.

When the armature 75 is positioned in alignment with the axis of the center core leg 141, the flux induced in the center leg by the A.C. voltage applied to coil 143 divides equally between the two end legs 137 and 138 of the core and produces equal and opposite voltages in the coils 145 and 146. Under this condition therefore, the net output voltage from the position transducer T is zero. This is the condition which is obtained when the drive coil 32 is in its centered position.

When the armature 75 is displaced away from this centered position, the flux divides unequally between the end legs 137 and 138 of the core. The amplitude of the resulting output voltage from transducer T varies linearly with the amount of angular displacement of the armature 75 from its centered position. In the phase sensitive detector 147, the transducer voltage is compared with the input voltage from oscillator 144 to determine the sign or polarity of the "position voltage," depending upon the direction in which the armature has been moved from its centered position.

The "position voltage" output signal from the phase sensitive detector 147 has a magnitude which depends upon the angular displacement of the armature 75 from its centered position. Since armature 75 moves angularly in unison with the drive coil 32, the "position voltage" varies as a straight line function of the angular displacement of drive coil 32 from its neutral position.

The lateral displacement of the recording tip 34*a* from its zero position is a function expressed exactly by Equation 3, which is almost a straight line function of the angular displacement of the drive coil 32. However, its deviation from an exactly straight line relationship increases as the displacement increases. This error is compensated by proper design of the feedback transducer T and phase sensitive detector 147. Thus, as the magnitude of the "position voltage" increases the network 134 produces an output signal to the amplifier 132 which is a linear function of the pen movement. The net result is that the pen tip is caused to have a lateral displacement which is precisely linearly proportional to the input signal which is being recorded.

In the event that the record chart is passed over a straight edge and the recording stylus records on the paper at this edge, then the lateral displacement of the recording portion of the stylus would be a tangent function. In such event, the feedback arrangement would be designed to correct for the resulting non-linearity of the stylus' movement laterally.

While certain presently-preferred embodiments of the present invention have been described in detail and illustrated in the accompanying drawings, it is to be understood that various modifications, omissions and refinements departing from the disclosed embodiments may be adopted without departing from the spirit and scope of this invention. For example, instead of recording with ink the recording stylus may record a visual trace by means of an electric spark or in any other manner. Also, the linkage of the present invention may be embodied in various devices, other than recorders, in which it is desired to convert rotational movement to straight-line movement, or vice versa.

What is claimed is:

1. A motion converting mechanism for converting from rotary to rectilinear movement or vice versa, said mechanism comprising a rotary first member rotatable on a fixed first axis of rotation, means coupled to said first member to turn therewith and defining a second axis of rotation extending parallel to said first axis and revolvable about said first axis as said first member rotates, a second member rotatable on said second axis, said second member having a rectilinearly movable portion spaced from said second axis by a distance greater than the spacing between said first and second axis and disposed for movement substantially rectilinearly at the opposite side of said first axis from said second axis, and means constructed and arranged with respect to said rotary first member, and including means acting on said second member, to cause said second member to rotate on said second axis, while said first member rotates on said first axis, in a direction opposite to that of said first member and at a rotational speed equal to $(1+K)$ times the rotational speed of said first member, K being a constant which is positive and less than one, in response to either rotation of said rotary first member or rectilinear movement of said rectilinearly movable portion of said second member.

2. A motion converting mechanism for converting rotation to rectilinear motion or vice versa, said mechanism comprising a rotatable first shaft member having a fixed axis of rotation, an elongated arm member having a portion which is movable substantially rectilinearly at one side of said axis, and a coupling acting between said members to either convert the rotation of said first member to rectilinear movement of said portion of the arm member or convert rectilinear movement of said portion of the arm member to rotation of said first member, said coupling comprising a rotatable second shaft member in spaced parallel relationship to said first shaft member at the opposite side of said axis from said rectilinearly movable portion of the arm member, said arm member being connected to said second shaft member to move in unison therewith, a rigid link extending laterally from said first shaft member and connected to the latter to turn therewith about said fixed axis of rotation, said second shaft member being carried by said link to revolve about the axis of the first shaft member as the latter rotates, and means constructed and arranged with respect to said first shaft member, and including means acting on said second shaft member, to cause said second shaft member to rotate on its own axis, in response to either the rotation of said first shaft member or rectilinear movement of said rectilinearly movable portion of said arm member, in a direction opposite to the direction in which said first shaft member rotates and at a rotational speed equal to $(1+K)$ times the rotational speed of said first shaft member, K being a constant which is positive and less than one, said arm member being substantially longer than said link.

3. The mechanism of claim 2 wherein $K=\sqrt{a/b}+\Delta k$, $a$ being the distance between the axes of said first and second shaft members, $b$ being the distance between the axis of said second shaft member and said rectilinearly movable portion of said elongated arm member, and $\Delta k$ being negative in sign and being a small fraction of $\sqrt{a/b}$.

4. The mechanism of claim 2 wherein there are provided a stationary hub rotatably receiving said first shaft member, said hub having a peripheral surface which is cylindrical about said fixed axis and which has a predetermined diameter $d_1$, said second shaft member having a cylindrical peripheral surface with a diameter $d_2$ which is smaller than $d_1$, and said last-mentioned means is a flexible band engaging said cylindrical peripheral surface of said hub and engaging said cylindrical peripheral surface of the second shaft member and extending tautly between them, the ratio $$\frac{d_1-d_2}{d_2}$$

being equal to $\sqrt{a/b}+\Delta k$, where $a$ is the distance between the axes of said shaft members, $b$ is the distance from the axis of said second shaft member to said rectilinearly movable portion of said elongated arm member, and $\Delta k$ is negative and is a small fraction of $\sqrt{a/b}$.

5. A mechanism for converting rotary motion to substantially straight-line motion comprising a rotary input shaft, a rotatable second shaft spaced from said input shaft and extending parallel thereto, means acting between said shafts to cause said second shaft to revolve about the axis of the input shaft in response to rotation of the input shaft, means constructed and arranged with respect to said input shaft, and including means acting on said second shaft, to cause said second shaft to rotate on its own axis in a direction opposite to the direction in which the input shaft rotates and at a rotational speed equal to $(1+K)$ times that of the input shaft in response to rotation of the input shaft, K being a constant which is positive and less than one, and a member extending laterally from said second shaft and having a rectilinearly movable portion disposed beyond the opposite side of said first shaft, said member being connected to said second shaft to turn in unison. therewith about the axis of said second shaft and to revolve in unison therewith about the axis of said input shaft to produce substantially straight-line movement of said rectilinearly movable portion of said member in response to rotation of said input shaft.

6. The mechanism of claim 5 wherein $K=\sqrt{a/b}+\Delta k$, $a$ being the distance between the axes of said shafts, $b$ being the length of said member from the axis of the second shaft to said rectilinearly movable portion, and $\Delta k$ being a negative value which is a small fraction of $\sqrt{a/b}$.

7. A mechanism for converting rotary motion to substantially straight-line motion comprising a rotary input shaft, a rigid link extending laterally from said input shaft and connected to said input shaft to turn in unison therewith, a rotatable second shaft carried by said link in spaced parallel relationship to said input shaft to revolve about the axis of said input shaft as the latter turns, a fixed reaction member concentric with said input shaft, means engaging both said reaction member and said second shaft and acting between them to cause said second shaft to turn on its own axis in a direction opposite to the direction in which the input shaft turns and at a rotational speed equal to $(1+K)$ times that of the input shaft in response to rotation of the input shaft, K being a constant which is positive and less than one, and an arm extending laterally from said second shaft and having a rectilinearly movable portion at the opposite side of said input shaft from said second shaft, said arm being connected to said second shaft to turn therewith on the latter's axis and to revolve therewith about the axis of the input shaft to produce substantially straight-line movement of said rectilinearly movable portion of the arm in response to rotation of the input shaft.

8. The mechanism of claim 7 wherein $K=\sqrt{a/b}+\Delta k$, $a$ being the distance between the axes of said shafts, $b$ being the distance from the axis of said second shaft to said rectilinearly movable portion of the arm, and $\Delta k$ being a negative value which is a small fraction of $\sqrt{a/b}$.

9. A mechanism for converting rotary motion to substantially straight-line motion comprising a first shaft rotatable on a fixed axis, a stationary hub, said hub having a peripheral surface which is cylindrical about said fixed axis and has a diameter $d_1$, a rigid link connected to said first shaft to turn therewith and extending transversely from said first shaft to swing in an arc about said fixed axis as the first shaft turns, a second shaft rotatable on said link in spaced parallel relationship to said hub and having a cylindrical peripheral surface with a diameter $d_2$ which is smaller than $d_1$, a flexible band engaging the respective cylindrical peripheral surfaces of said hub and said second shaft and extending tautly between them to cause the second shaft to turn on its own axis in response to rotation of said first shaft, and an arm coupled to said second shaft to turn therewith and extending transversely from said second shaft and having a rectilinearly movable portion at the opposite side of said first shaft from said second shaft, the ratio $$\frac{d_1-d_2}{d_2}$$

being equal to $\sqrt{a/b}+\Delta k$, where $a$ is the distance between the axes of the shafts, $b$ is the distance from the axis of the second shaft to said rectilinearly movable portion of said arm, and $\Delta k$ has a negative value which is a small fraction of $\sqrt{a/b}$.

10. In a pen recorder having a motor including a magnet system and a coil, one being movable relative to the other, and means for applying an input signal to said coil, the improvement which comprises a first shaft driven by said motor and rotatable on a fixed axis, a second shaft spaced from said first shaft and extending parallel thereto, means acting between said shafts to cause said second shaft to revolve about said fixed axis in response to rotation of the first shaft, means constructed and arranged with respect to said first shaft, and including means acting on said second shaft, to cause said second shaft to rotate on its own axis in a direction opposite to the direction in which said first shaft rotates and at a rotational speed equal to $(1+K)$ times that of said first shaft in response to rotation of the first shaft, K being a constant which is positive and less than one, and a recording arm extending laterally from said second shaft, said recording arm being connected to said second shaft to revolve in unison therewith about said fixed axis and to rotate in unison therewith about the axis of the second shaft in response to rotation of the first shaft, said recording arm having a rectilinearly movable recording tip at the opposite side of said first shaft from said second shaft.

11. The recorder of claim 10, wherein $K=\sqrt{a/b}+\Delta k$, $a$ being the distance between the axes of said first and second shafts, $b$ being the length of said recording arm from the axis of the second shaft to the recording tip, and $\Delta k$ being a negative value which is a small fraction of $\sqrt{a/b}$.

12. In a pen recorder having a motor including a magnet system and a coil, one being movable relative to the other, and means for applying a signal to said coil, the improvement which comprises the combination of a first shaft driven by said motor and rotatable about a fixed axis, a stationary hub rotatably receiving said first shaft, said hub having a peripheral surface which is cylindrical about said fixed axis and has a diameter $d_1$, a rigid link extending laterally from said first shaft and connected to the latter to turn in unison therewith, a second shaft carried by said link is spaced parallel relationship to said first shaft to revolve about the latter's axis as the latter turns, said second shaft being rotatable on its own axis and having a cylindrical peripheral surface with a diameter $d_2$ which is smaller than $d_1$, a flexible band engaging the cylindrical peripheral surface of said hub and engaging the cylindrical peripheral surface of the second shaft and extending tautly between them, and a recording arm extending laterally from said second shaft and connected to the latter to move in unison therewith, said recording arm being longer than said link and having a rectilinearly movable writing tip disposed at the opposite side of said first shaft from said second shaft.

13. The combination of claim 12 wherein the ratio $$\frac{d_1-d_2}{d_2}$$

is equal to $\sqrt{a/b}+\Delta k$, where $a$ is the distance between the axes of said shafts, $b$ is the distance between the axis of said second shaft and said writing tip, and $\Delta k$ is within the range from substantially zero to $-.014$.

14. A pen recorder comprising a magnet system including two spaced confronting pole piece members of soft magnetic material, a rigid non-magnetic piece secured to both said members and holding them fixedly, said members presenting a pair of spaced confronting arcuate pole faces which are on a common circle about a first axis, a magnet assembly having opposite polarity legs engaging said members, a coil structure in the space between said pole faces, said coil structure presenting a first leg extending lengthwise in close-spaced proximity to one of said pole faces and a second diametrically-opposite leg extending lengthwise in close-spaced proximity to the other of said pole faces and opposite end members connecting said legs, a stationary core of magnetizable material inside said coil structure and spaced from the latter, a rotatable rigid first shaft extending lengthwise centrally through and beyond said core, said shaft being connected to the coil structure beyond the opposite ends of the core and reinforcing the coil structure against stresses, means for applying a signal to said coil, a stationary hub disposed beyond said core at the end thereof remote from the magnet, said hub having a peripheral surface which is cylindrical about the axis of said first shaft and which has a diameter $d_1$, a rigid link extending laterally from said first shaft and connected to the latter to turn in unison therewith, a second shaft carried by said link in spaced parallel relationship to said first shaft to revolve about the latter's axis as the latter turns, said second shaft being rotatable on its own axis and having a cylindrical peripheral surface with a diameter $d_2$ which is smaller than $d_1$, a flexible band engaging the cylindrical peripheral surface of said hub and engaging the cylindrical peripheral surface of the second shaft and extending tautly between them, and a recording arm extending laterally from said second shaft and connected to the latter to move in unison therewith, said recording arm being longer than said link and having a rectilinearly movable recording tip at the opposite side of said first shaft from said second shaft, the ratio $$\frac{d_1-d_2}{d_2}$$

being equal to $\sqrt{a/b}+\Delta k$, where $a$ is the distance between the axes of said shafts, $b$ is the distance between the axis of said second shaft and the writing tip, and $\Delta k$ is within the range from substantially zero to —.014.

References Cited in the file of this patent

UNITED STATES PATENTS

| | | |
|---|---|---|
| 2,171,327 | Anderson | Aug. 29, 1939 |
| 2,442,586 | Clark | June 1, 1948 |
| 2,463,882 | Kent et al. | Mar. 8, 1949 |
| 2,814,549 | Perry | Nov. 26, 1957 |
| 2,903,896 | Greene | Sept. 15, 1959 |
| 2,932,776 | Massa | Apr. 12, 1960 |
| 2,942,927 | Keyser | June 28, 1960 |